June 24, 1941. F. L. BISHOP, JR 2,247,010
FILMING FEEDER
Filed April 14, 1939
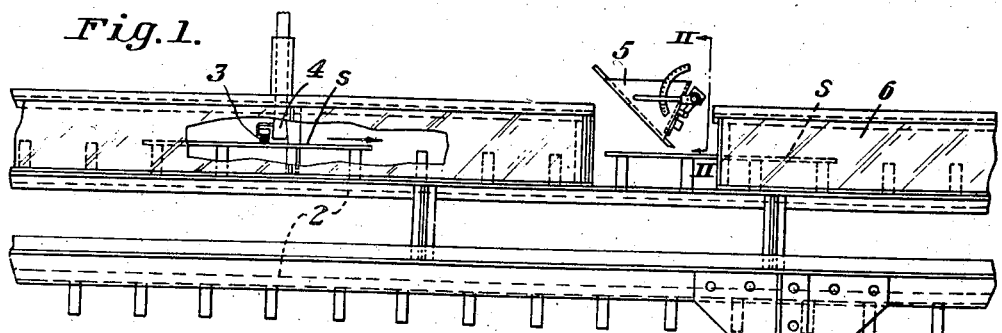
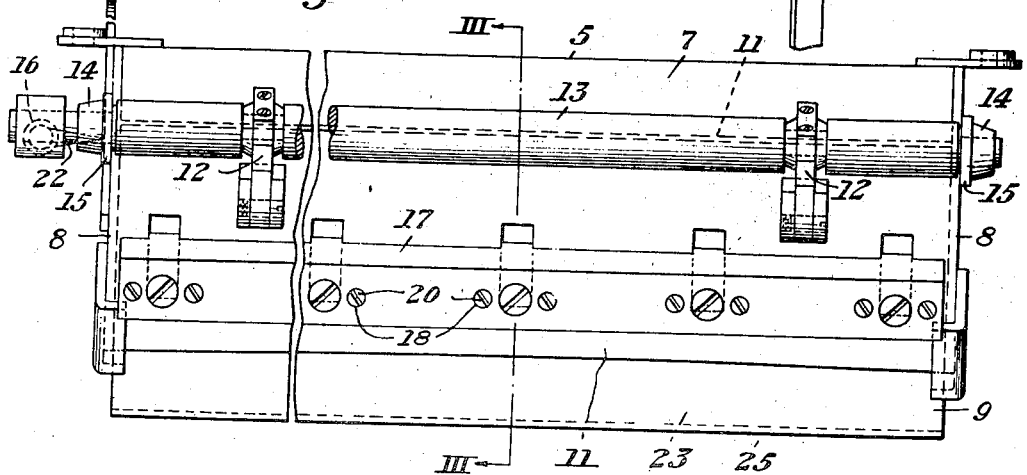
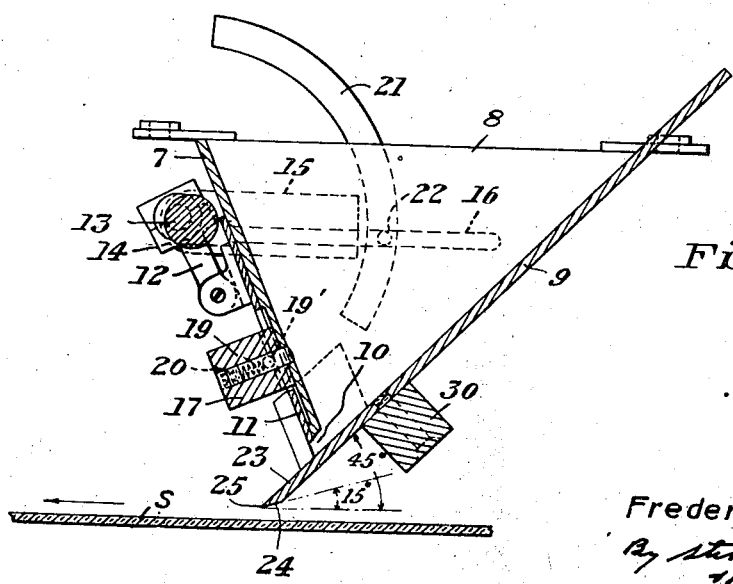
INVENTOR
Frederic L. Bishop Jr.

Patented June 24, 1941

2,247,010

UNITED STATES PATENT OFFICE 2,247,010

FILMING FEEDER

Frederic L. Bishop, Jr., Jeannette, Pa., assignor to American Window Glass Company, Pittsburgh, Pa., a corporation of Pennsylvania Application April 14, 1939, Serial No. 267,946

3 Claims. (Cl. 91—43)

The present invention relates to filming feeders for the formation of a film of a material in liquid form on a sheet positioned therebelow. My invention is particularly applicable to feeders for flowing a film of strengthening material in liquid form on a glass sheet to be used in the manufacture of laminated glass. My invention is not limited to feeders of this character but in order to facilitate the description of the invention and in order to point out the advantages thereof it will be described herein as applied to feeders of this type.

In the so-called liquid process of manufacturing laminated glass the glass sheets are carefully and thoroughly cleaned and then placed on a conveying mechanism which carries the sheets past apparatus for removing any dust or dirt which may have gotten on the glass sheets after the cleaning operation was performed. Thereafter the glass sheets are carried by the conveying mechanism beneath a filming feeder which flows a relatively thick film of a strengthening material in liquid form on each of the glass sheets. The glass sheets are then passed through a drying oven on appropriate conveying mechanism for drying the layers of strengthening material and after the drying takes place the coated glass sheets are united either with an uncoated glass sheet or a similarly coated glass sheet in any suitable manner. The sandwich thus formed is subjected to pressure or heat in order to effect a satisfactory bond.

In this process considerable difficulty has been encountered in the formation of the films of strengthening material on the glass sheets and in the subsequent operations and unless the operations are carried out with great care the resulting product will be unsatisfactory. Streaks sometimes are present in the finished product which render it entirely unsatisfactory. At times satisfactory bonding is not obtained between the strengthening material and the glass sheets and these non-contacts render the finished product entirely unsatisfactory. In addition a satisfactory cutoff of the strengthening material along the edges of the glass sheets is frequently not obtained. When this condition prevails the strengthening material, which is in a highly viscous state when it is flowed on the glass sheets, will not be evenly distributed over the areas of the glass sheets and this results in non-contacts and other difficulties. I have found that these difficulties are caused in most instances by the freezing up of the strengthening material on the lip or lower edge of the filming feeder as the strengthening material is flowed onto the glass sheets.

I have found that by changing the lower edge of the lip of the filming feeder over which the strengthening material flows onto the glass sheet these difficulties can be eliminated. I have found that by beveling the lower edge of this lip so as to cause the strengthening material to leave the lip from a relatively sharp point the strengthening material will not freeze up along the lip. This eliminates the necessity of regularly cleaning off the lower end of the lip. This prevents the necessity of interrupting operations during the filming of the sheets. Streaks, non-contacts, and poor cut-off are all eliminated by this invention and, furthermore, it permits the use of a strengthening material which has a substantially higher viscosity than that which has been utilized to date. Heretofore it has been considered impossible to increase the viscosity of the liquid strengthening material when it is flowed on the glass sheets because when increased a nonuniform film resulted. However, where a feeder embodying my invention is utilized I have found that a uniform film can be obtained on the glass sheets even though the viscosity of the strengthening material be substantially increased.

In the accompanying drawing I have shown for purposes of illustration only a preferred embodiment of my invention. In the drawing—

Figure 1 is a side elevation of a filming feeder embodying my invention and the equipment utilized in conjunction therewith;

Figure 2 is a view taken along the line II—II of Figure 1; and

Figure 3 is a section taken along the line III—III of Figure 2.

As shown in the drawing, the glass sheets to be coated with the layer of strengthening material are placed on conveying mechanism indicated generally by the reference character 2. Each sheet S is carried past a brush 3 which loosens any dust or dirt which may remain on the sheet after the usual cleaning operation. The sheet then is carried past a suction nozzle 4 which removes the dirt or dust which has been loosened by the brush 3. Each glass sheet then is carried past the filming feeder 5 where a film or layer of strengthening material is flowed thereon. Each sheet then passes into the closed chamber 6 and from there passes through the drying apparatus for drying the film thereon.

The filming feeder 5 if formed of a front sheet or wall 7, side walls 8 and a bottom wall or sheet 9. These walls form a trough which is adapted to receive the liquid strengthening material and to discharge it in the form of a film on the glass sheets. The lower end of the front wall 7 is spaced above the bottom wall 9 so as to provide an opening 10 through which the strengthening material may flow. The front wall 7 is fixed relative to the bottom wall 9 but in order to vary the discharge opening so as to control the rate of flow of the strengthening material and the thickness of the film on the glass sheets a gate 11 is provided. This gate is carried by connecting links 12 which are supported on an eccentric shaft 13 carried by bearings 14 in bearing plates 15 supported on the side walls. A valve handle 16 is secured to one end of the eccentric shaft for rotating the shaft and thereby raising or lowering the gate 11. A tension bar 17 is secured to the front wall 7 and this bar is provided with openings 18 adapted to receive springs 19 which are placed under compression by screws 20. The inner end of each spring bears against a ball 19' which bears against the gate, and these springs hold the gate tightly against the front wall.

A quadrant 21 is mounted on one side wall and bears appropriate indicia. The handle 16 carries an appropriate pointer 22 cooperating with the indicia on the quadrant to indicate the position of the gate 11.

The bottom wall 9 has a lip portion 23 which extends below or beyond the discharge opening 10 so that as the liquid strengthening material is discharged through the opening it flows over this inclined lip portion before being discharged onto the glass sheet S being carried therebelow. The lower edge of the lip of the bottom wall is beveled rearwardly as indicated at 24 so as to provide a point 25 from which the strengthening material is discharged onto the glass sheet. The bottom face of the bottom wall is preferably beveled rather than the top face. I have found that best results can be obtained when the bevel 24 is of such character as to be entirely positioned above a horizontal line drawn through the point 25. By horizontal line I mean a line paralleling the plane of the sheet upon which the strengthening material is flowed. I prefer that the bevel 24 extend upwardly at an angle of approximately 15° from this horizontal line and that the bottom plate extend at an angle of approximately 45° to the horizontal. The lip of the bottom plate extends forwardly in the direction of travel of the glass sheet so that the point 25 is pointed in the direction of travel.

The strengthening material passes through the discharge opening 10 and then flows downwardly along the lip 23 and is discharged onto the glass sheet from the point 25. In view of the fact that the bevel 24 is above the horizontal line or plane passing through the point 25, there is no tendency whatever for the viscous material to flow around the edge. By eliminating this tendency it is possible to completely eliminate any freezing up along the lip and this in turn eliminates the various difficulties mentioned above and which have been heretofore prevalent in this process of manufacturing laminated glass.

In view of the necessity of preventing the bottom wall from sagging or becoming warped a reinforced bar 30 extends horizontally along the bottom face thereof. If the bottom wall is not sufficiently rigid or sufficiently reinforced the film passing through the discharge opening 10 will not be uniform and due to the shortness of the lip 23 the film may not have sufficient opportunity to become uniform in thickness before it is flowed on the glass sheets. As is well known, it is highly desirable that the film be of substantially uniform thickness when it is flowed on the glass sheet otherwise difficulties, such as non-contacts, will be encountered. Increased pressures and temperatures are also required where the films are not substantially uniform when flowed on the glass sheets because the strengthening material is of such viscosity at this time that it will not flow sufficiently over the glass sheets to correct any substantial disparities in thickness.

While the filming feeder which I provide differs only from the prior art in the character of the edge from which the strengthening material is discharged onto the glass sheets, this change has brought about the surprising results mentioned above. Cleaning of the edge, streaks, poor cut-off, non-contacts and non-uniformity of film have been eliminated and the use of a strengthening material having a substantially higher viscosity permitted.

While I have shown and described a preferred embodiment of my invention, it will be understood that my invention is not to be limited to the specific structure shown and described. My invention may be otherwise embodied within the scope of the appended claims.

I claim:

1. A filming feeder for flowing a film of strengthening material on glass sheets to be used in manufacturing laminated glass, comprising front, side and bottom walls, forming a trough for receiving the filming material, the front wall being spaced above the bottom wall throughout a substantial portion of its length to provide a discharge opening, and the bottom wall extending downwardly and forwardly beyond the lower end of the front wall of the trough to an appreciable extent and having its lower end bevelled at a substantial angle to the horizontal to provide a sharp edge beyond the lower end of the front wall from which the filming material flowing thereover is discharged therefrom.

2. A filming feeder for flowing a film of material on glass sheets comprising front, side and bottom walls forming a trough for receiving the filming material, the front wall being specified above the bottom wall throughout a substantial portion of its length to provide a discharge opening, and the bottom wall extending downwardly and forwardly beyond the lower end of the front wall of the trough to an appreciable extent and having its bottom face and edge bevelled away from the top face at the lower end thereof at a substantial angle to the horizontal to provide a sharp edge beyond the lower end of the front wall and beyond the discharge opening and in the plane of the top face of said wall from which the filming material flowing over the top face is discharged.

3. A filming feeder for flowing a film of strengthening material on a glass sheet to be used in the manufacture of laminated glass, comprising a front wall, side walls, and a bottom wall cooperating with the front and side walls to form a trough adapted to receive and support the liquid strengthening material, the bottom wall being spaced below the front wall throughout a substantial portion of its length to provide a discharge opening and extending below the discharge opening and beyond the lower end of the front wall so that the strengthening material flows along the top surface of said bottom wall after leaving the discharge opening, and said bottom wall having its lower edge bevelled at a substantial angle to the horizontal to provide a sharp edge spaced from the discharge opening and from which the film is discharged onto the glass sheet therebelow.

FREDERIC L. BISHOP, Jr.